(12) United States Patent
Frenkel et al.

(10) Patent No.: US 6,538,454 B1
(45) Date of Patent: Mar. 25, 2003

(54) NEAR FIELD MICROWAVE RESISTIVITY MICROSCOPE INCLUDING A DIELECTRIC RESONATOR

(75) Inventors: Avraham Frenkel, Kirait Bialik (IL); Dan Davidov, Jerusalem (IL); Michael Golosovsky, Ma'ale Adumim (IL)

(73) Assignee: Yissum Research Development Company of the Hebrew University Jerusalem, Jerusalem (IL)

( * ) Notice: Subject to any disclaimer, the term of this patent is extended or adjusted under 35 U.S.C. 154(b) by 122 days.

(21) Appl. No.: 09/657,383

(22) Filed: Sep. 8, 2000

(51) Int. Cl.[7] .............................................. G01R 27/04
(52) U.S. Cl. ...................... 324/637; 324/639; 324/642; 324/631
(58) Field of Search ................................ 324/631, 637, 324/632, 633, 639, 642, 635, 636; 73/514.31, 514, 16

(56) References Cited

U.S. PATENT DOCUMENTS

| | | | | |
|---|---|---|---|---|
| 5,781,018 A | * | 7/1998 | Davidov et al. | 324/637 |
| 5,821,410 A | | 10/1998 | Xiang et al. | 73/105 |
| 5,900,618 A | | 5/1999 | Anlage et al. | 250/201.3 |
| 6,020,800 A | * | 2/2000 | Arakawa et al. | 333/208 |
| 6,100,703 A | * | 8/2000 | Davidov et al. | 324/631 |
| 6,209,482 B1 | * | 4/2001 | Doehler | 118/723 |
| 6,376,836 B1 | | 4/2002 | Anlage et al. | 250/234 |
| 2002/0041221 A1 | * | 4/2002 | Abdulnour | 333/202 |

OTHER PUBLICATIONS

Poole, "A comprehensive treatise on experimental techiniques", *Electron spin resonance*, second edition, copyright 1983, p. 149.

M. Tian et al., "Technique matches miniature waveguide-antenna apertures", *Microwave & RF*, Feb. 1995, pp. 100–105.

Cherpak et al., "Dielectric constant characterization of large-area substrates in millimeter wave band", *International Journal of Infrared and Millimetr Waves*, vol. 17, No. 5, 1996, pp. 819–831.

L. Hao et al., "Spatially resolved measurements of HTS microwave surface impedance", *IEEE Transactions on Applied Superconductivity*, vol. 9, No. 2, Jun. 1999, pp. 1944–1947.

Golosovsky et al., "Novel millimeter–wave near–field resistivity microscope", *Applied Physics Letters*, vol. 68, No. 11, Mar. 11, 1996, pp. 1579–1581.

Lann et al., "Combined millimeter–wave near–field microscope and capacitance distance control for the quantitative mapping of sheet resistance of conducting layers", *Applied Physics Letters*, vol. 73, No. 19, Nov. 9, 1998, pp. 2832–2834.

(List continued on next page.)

*Primary Examiner*—N. Le
*Assistant Examiner*—T. R. Sundaram
(74) *Attorney, Agent, or Firm*—Charles S. Guenzer (57) ABSTRACT

A microwave microscope having a resonant slit formed in a highly conductive end of a microwave waveguide forming a probe tip. A short dielectric rod is fit into the waveguide near its conductive end. A longer dielectric rod is placed in back of the short dielectric rod with a small gap between the two rods. The length of the shorter rod and the size of the gap are chosen to form a dielectric resonator at the microwave frequency adjacent to the probe tip. Thereby, the impedance of the waveguide can be matched to the generally high impedance of the slit probe tip. Preferably, the dielectric constant of the materials is high, thereby reducing the size of the waveguide and probe tip relative to the microwave wavelength.

25 Claims, 4 Drawing Sheets

OTHER PUBLICATIONS

Tabib–Azar et al., "Nondestructive superresolution imaging of defects and nonuniformities in metals, semiconductors, dielectrics, composites, and plants using evanescent microwaves" *Review of Scientific Instruments*, vol. 70, No. 6, Jun. 1999, pp. 2783–2791.

C. Gao et al., "Quantitative microwave near–field microscopy of dielectric properties", *Review of Scientific Instruments*, vol. 69, No. 11, Nov. 1998, pp. 3846–3851.

Steinhauer et al., "Quantitative imaging of sheet resistance with a scanning near–field microwave microscope", *Applied Physics Letters*, vol. 72, No. 7, Feb. 16, 1998, pp. 861–863.

* cited by examiner

(PRIOR ART)

FIG. 1

(PRIOR ART)

FIG. 2

(PRIOR ART)

NEAR FIELD MICROWAVE RESISTIVITY MICROSCOPE INCLUDING A DIELECTRIC RESONATOR

FIELD OF THE INVENTION

The invention generally relates to electrical measuring equipment and methods. In particular, the invention relates to microwave equipment and methods for mapping resistivity, thickness, and other electrical characteristics over a surface with resolution of a few micrometers, that is, a microwave microscope.

BACKGROUND ART

In U.S. Patent 5,781,018, two of us, Davidov and Golosovky, describe a microwave microscope including a single resonant slit. We describe an improvement of this microwave microscope in U.S. Pat. No. 6,100,703 including a crossed pair of resonant slits. Both these patents are incorporated by reference in their entireties.

Figure 1:
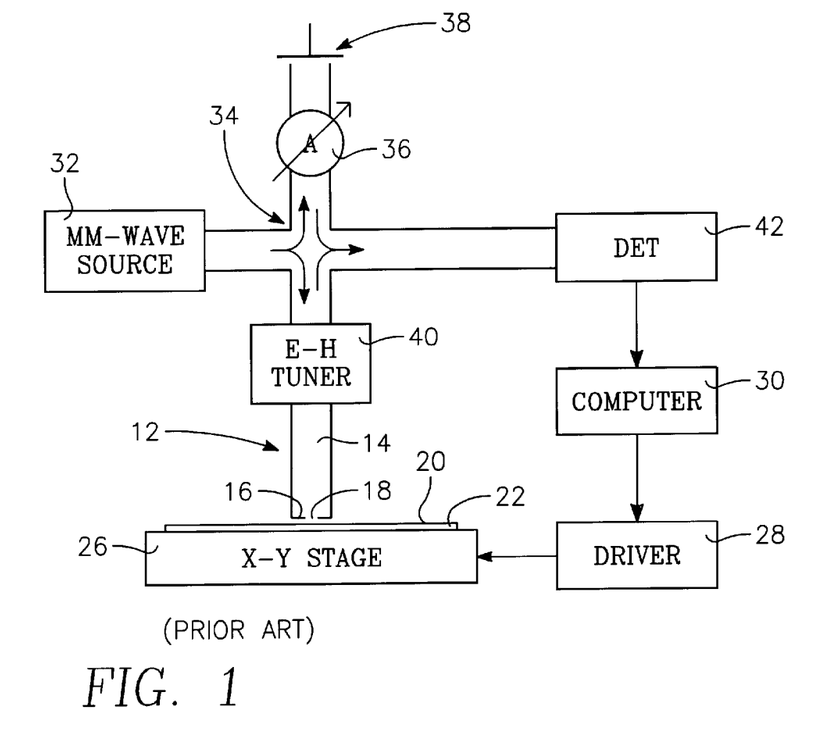
FIG. 1 is a schematic representation of a scanning microwave microscope system of the prior art.

The prior-art microscope of U.S. Pat. No. 5,781,018, as illustrated schematically in FIG. 1, includes a microwave probe 12 formed of a rectangular waveguide 14, the probe end of which is covered with a thin conductive foil 16. A resonant slit 18, to be described in more detail later, is formed in the conductive foil 16. The probe end is positioned over a front surface 20 of a sample 22 to be scanned. For example, the sample 22 may be a silicon wafer covered by metallic and/or dielectric layers and having various very small features formed in its surface 20 which need to be electrically characterized. The sample 22 is mounted on an X-Y stage 26 driven by a drive 28 under the control of a computer 30 so as to allow the probe 12 to be scanned over the sample surface 20. A source 32 of microwave radiation, provides the probing microwaves to a microwave bridge formed of a hybrid tee, an adjustable attenuator 36, a sliding short 38, and an E-H tuner 40 that matches the impedance of the probe antenna (slit) 18 to that of the waveguide 14. A microwave detector 42 receives radiation from the bridge to thereby measure its imbalance, and the intensity is transmitted to the computer 30. The amount of imbalance is determined, in part, by the electrical characteristics of the material in the sample 22 immediately below the slit 18, and thus can be used to measure those electrical characteristics on a scale equal to the dimensions of the slit. In the patent, the microwave radiation is in the millimeter band, about 80 GHz.

Figures 2, 3:
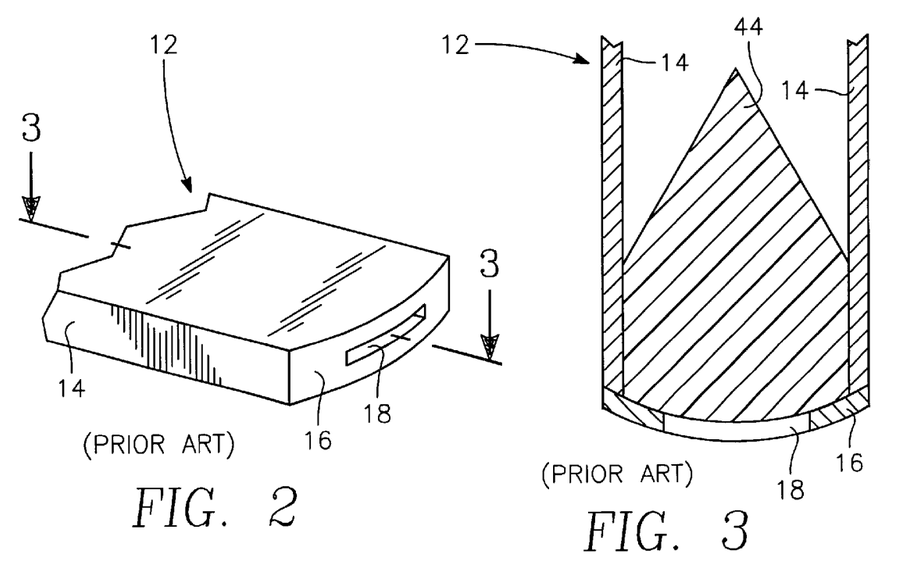
FIG. 2 is an orthographic view of the microwave probe of the microscope of FIG. 1
FIG. 3 is a cross-sectional view of the tip of the microwave probe of FIG. 2.

In a preferred embodiment illustrated orthographically in FIG. 2, the probe 12 is formed with a one-dimensionally curved foil end 16. The long dimension of the slit 18 extends along the curve, and the short dimension of the slit 18 is transverse to the curve. As is described in detail in the two patents, if the long dimension of the slit 18 is made nearly resonant with the probing radiation, that is, half of a free-space wavelength (a few millimeters at 80 GHz), the slit's short dimension can be made nearly arbitrarily small, but the probe end remains nonetheless nearly transparent to the microwave radiation. If the slit's short dimension is formed to the order of micrometers or somewhat less, the short dimension defines the sampling resolution of the probe along the transverse direction of the slit.

The mechanical stability of the convexly curved probe end is improved, as illustrated in the side cross-sectional view of FIG. 3, by placing a low-loss dielectric body 44 at the end of the probe. Its curved front end supports the thin foil 16. Its sides fit closely to the rectangularly shaped waveguide 14. Its pyramidally shaped back end minimizes microwave reflection. To further minimize microwave reflection, the dielectric body should have a low dielectric constant, for example, $\epsilon=2.2$. U.S. Pat. No. 5,781,018 also teaches dielectrically loading the entire microwave waveguide.

The U.S. Pat. No. 6,100,703 includes two resonant slits arranged perpendicularly. Polarization-sensitive detection equipment then allows separated detection of the incident polarization and the perpendicular polarization. The rotated polarization (90° rotated) is particularly useful for mapping Hall mobilities, anisotropies, and local non-uniformities.

An important task for the near-field microwave microscope is the contactless characterization of conductive layers, particularly thickness mapping of thin metal layers overlying a dielectric underlayer. For conductive films that are thinner than the skin-depth of their constituent metal, the characterization may be conveniently performed through the local measurement of the sheet resistance $R_{sh}=\rho/t$, where $\rho$ is the bulk resistivity of the metal and $t$ is the thickness of the metal layer. The metal layers most used in semiconductor fabrication are composed of Cu, Ag, Al, and W and have thicknesses in the range of 0.1 to 3 $\mu$m and sheet resistances in the range of 0.1 to 10 $\Omega$. The skin-depths for these materials at microwave frequencies between 1 and 100 GHz are in the range of 0.2 to 1 $\mu$m. Thus, a microwave microscope of proper design can in many cases characterize the sheet resistance and thus thickness of these metal layers. In the fabrication of semiconductor integrated circuits, it is often important to determine the uniformity of metal deposition to assure a sufficiently thick metal layer on all portions of the wafer.

However, the use of a microwave microscope for conductive layer of appreciable thickness, even of a significant fraction of a skin depth, requires the use of low impedance probe. The sensitivity of a simple slit probe and of most popular microwave probes is such that they allow the characterization of conductive films with sheet resistances of 100 $\Omega$ or greater. This sensitivity is not enough to effectively probe metal layers of sheet resistance of less than 10 $\Omega$. Hao et al. have disclosed a low-impedance scanning dielectric resonator in "Spatially resolved measurements of HTS microwave surface impedance," IEEE *Transaction in Applied Superconductivity*, vol. 9, no. 2, Jun. 1999, pp. 1944–1947. However, their resolution of a few millimeters is not fine enough for characterizing the small features of modern semiconductor integrated circuits.

Accordingly, it is desired to provide a probe capable of electrically characterizing conductive layers on a semiconductor wafer. In particular, it is desired to provide such a probe for layers having sheet resistance of less than 10 ohms.

It is further desired to provide a microwave probe antenna that has a narrow slit and a low electrical impedance.

SUMMARY OF THE INVENTION

A microwave microscope including a narrow resonant slit in a conductive end of the probe tip and a dielectric resonator in the waveguide behind the resonant slit to impedance match the waveguide to the high impedance slit. The dielectric resonator is formed by a resonator member having a high dielectric constant, placed next to the resonant slit, and having a resonant length, of the order of the microwave radiation in the material. A long dielectric member is placed in back of the resonator member and separated from the resonator member by a small gap having a width chosen to form an impedance transformer matching the waveguide impedance to the impedance of the combination of the slit and resonator member. The gap width preferably is in the range of 0.1% to 100% of the free-space wavelength of the microwave radiation. The gap may be operationally set by varying its length to minimize microwave reflection from assembly of the slit and the resonator member.

The front end of the resonator member, that is, the end facing free space may be flat or preferably convex. The conductive end of the waveguide and the slit may be formed by coating this front surface of the resonator member with a metal layer and forming the slit in the coated metal.

DETAILED DESCRIPTION OF THE PREFERRED EMBODIMENTS

A microwave probe built according to one aspect of the invention includes a waveguide which has a resonant slit at one end and which is loaded with a predetermined length of dielectric at the probe end to form a low-Q dielectric resonator which acts as a impedance transformer. One such probe 50 is illustrated in cross section in FIG. 4 and in end elevation in FIG. 5 taken along view line 5—5 in FIG. 4. A circular waveguide is formed by a metallic tube 52 having an inner diameter of, for example, 2.5 mm for microwave radiation in the range of 25 to 30 GHz. This microwave frequency is substantially less than that for 80 GHz millimeter waves of U.S. Pat. Nos. 5,781,018 and 6,100,703. A short alumina rod 54 of length l tightly fits into the probe end of the microwave tube 52. The length l is approximately equal to a quarter of the microwave wavelength in the dielectric material (or a small multiple thereof), taking into account the dielectric loading of the waveguide. However, the resonance condition is more complicated, as will be discussed later. An exemplary resonator rod length l is 1.7 mm. The short rod 54 may be formed of other dielectric material, preferably having a high dielectric constant. One such other material is sapphire.

Figure 4:
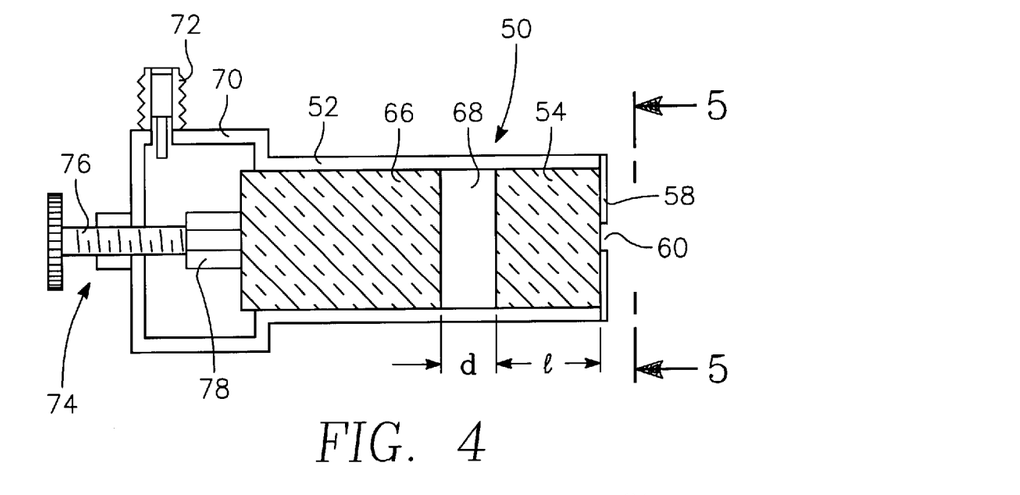
FIG. 4 is a cross-sectional view of a one embodiment of a microwave probe of the invention including a dielectric resonator.

The front end of the short alumina rod 54 is coated with a thin silver layer 58 except in the area of a slit 60 having a width w and a length L. The slit length L is determined by computer simulations but is approximately half the microwave wavelength in the alumina, approximately 2 mm, and the slit width w is preferably less than 30 $\mu$m and can be fabricated to widths down to 0.5 $\mu$m.

Figure 6:
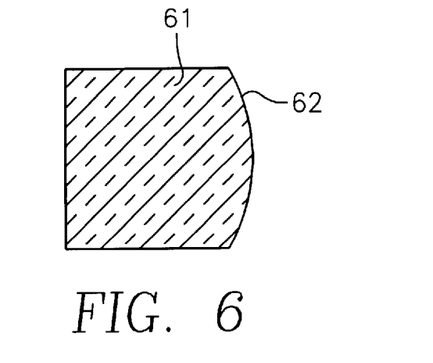
FIG. 6 is a cross-sectional view of a convexly shaped dielectric rod usable in a microwave probe of the invention.
Figure 7:
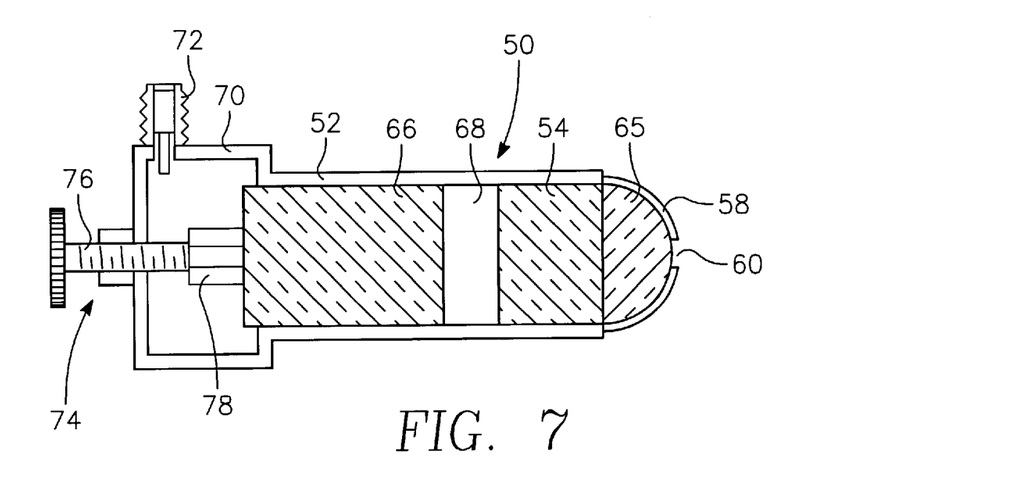
FIG. 7 is a cross-sectional view of another embodiment of a microwave probe of the invention using a separable hemispherical lens.

Rather than the right cylindrical rod 54 of FIG. 4, a short alumina rod 61, illustrated in cross section in FIG. 6, may be ground to have a convex face 62. Alternatively, a composite rod may be formed, as illustrated in FIG. 7 by cutting a commercially available sapphire lens having the same diameter as the short dielectric rod 54 into two hemispheres and fixing one hemisphere 65 to the flat end of the alumina or sapphire rod 54 with adhesive. Sapphire has nearly the same dielectric constant as alumina, $\epsilon$=9.8. In this case, the length l of the short rod should be reduced, for example, to 1.7 mm, and the length of the slit measured along the surface of the hemisphere 65 should be increased, for example, to 3 to 4 mm.

Returning to FIG. 4, a second, long alumina rod 66 is slidably fit into the other end of the microwave tube 52 with an air gap 68 of controlled variable length d between the two alumina rods 54, 66. A exemplary length of the long rod 66 is 15 mm. Except for the gap 68, the 2.5 mm microwave tube 52 loaded with the dielectric alumina rods 54, 66 has a cut-off frequency of 22.6 GHz. The dielectrically loaded waveguide will not support microwave radiation at frequencies below the cut-off frequency. Note that the cut-off frequency for an unloaded waveguide of the same size is about 71 GHz.

A coax-to-waveguide adaptor 70 is joined mechanically and electrically to the microwave tube 52. It includes a coax connector 72 and a tuning mechanism 74 for adjusting the size of the gap 68. The adaptor 70 is designed by well known principles to perform two functions. It couples the fundamental TEM mode of the coaxial cable to the fundamental (TE$_{11}$) mode of the dielectrically loaded circular waveguide 52. It also impedance matches the 50$\omega$ of the coaxial cable to the 120$\omega$ of the circular waveguide 52 dielectrically loaded with alumina. The tuning mechanism includes a tuning screw 76 engaging a thin-wall glass tube 78 pushing the long rear alumina rod 66 towards the gap 68. This mechanism is capable of adjusting the gap length d between at least 0.01 to 2 mm.

The two dielectric rods 54, 66 perform two functions. First, the relatively high dielectric constant $\epsilon$ of over 9 allows the diameter of the microwave tube 52 to be decreased by the factor of the square root of $\epsilon$, and for the most part, the dimensions associated with the probe end are also decreased, thereby improving the spatial resolution of the microscope. Alternatively, the sizes of the microwave components can be maintained the same while the microwave frequency is decreased by the square root of $\epsilon$. A decrease of operating frequency results in an increase of the skin depth of the sample being probed, which is particularly advantageous for probing samples having conductive surface layers. Furthermore, lower-frequency microwave equipment is less expensive and more commonly available than millimeter-wave equipment.

Furthermore, the finite length of the short dielectric rod 54 and the finite gap 68 results in the end dielectric 54 acting as a dielectric resonator which operates as an impedance transformer to match the high radiation impedance of the slit 60 to the more moderate impedance of the feeding structure, either the 50ω of the coaxial cable or the 400 to 500ω of an air-filled waveguide. Power is launched across the gap 68 into the dielectric resonator. The narrow slit at the other end allows only a small fraction of the power in the resonator to leak outside through the slit. The length of the resonator rod 54 is chosen to be nearly resonant between its two reflective ends. The input end is reflective to microwave radiation because the mismatch with the gap 68 acts as a microwave open. The output end is covered with a highly conductive layer except in the relatively small area of the slit 60 so that it also is highly reflective. Therefore, both ends present a large impedance mismatch, and the power within the dielectric resonator builds up as the power is repetitively reflected between the slit end and the gap end. As a result, the fraction of input power leaking through the slit 60 is increased. The introduction of the dielectric resonator eliminates the need for the E-H tuner 40 of FIG. 1. The long dielectric rod 66 is preferably at least two times the length of the short dielectric rod 54 and allows a uniform microwave field to propagate along the long dielectric rod 66 before being launched into the resonator formed by the short dielectric rod 54 between the gap 68 and the slit metallic end.

Yet further, the use of the dielectric resonator increases the sensitivity of the microscope because of the high dielectric constant. We have used an empirical measure s for the sensitivity, a derivative of the minimum microwave reflectivity $|S_{11}|$ of the measurement of the sample being normalized to a measurement with a perfectly conducting sample (bulk copper plate).

$$s = \frac{1}{S_{11}(R_{sh} \to 0)} \frac{\partial S_{11}(R_{sh})}{\partial R_{sh}}. \tag{1}$$

The inverse of the sensitivity s has units of impedance $1/s = Z_p$, which characterizes the probe so that a low probe impedance $Z_p$ corresponds to high sensitivity s. This effective impedance $Z_p$ is distinct from the slit impedance $Z_{Sl}$ as seen from the waveguide. While $Z_{Sl}$ is determined by the magnitude and phase of the reflection from the conducting wall containing the slit, $Z_p$ is determined by the ratio of the electric field magnitude to the magnetic field magnitude at the plane of the slit. In dielectric media, this ratio decreases with the dielectric constant $\epsilon$, approximately according to $E/H \sim 1/\epsilon^{1/2}$. Although the sample is not inside the dielectric, it is in the near field of the slit so that the ratio of the electric to magnetic fields is approximately maintained. Therefore, the effective impedance of the dielectric loaded probe is reduced from that of an unloaded probe. The effective probe impedance should be made as small as practical. It the previous designs of air-filled microwave probe and a bare slit, the effective probe impedance was in the range of 100 to 120. In contrast, the dielectric resonator of FIG. 4 has been tested to produce an effective probe impedance of 20Ω.

Figure 5:
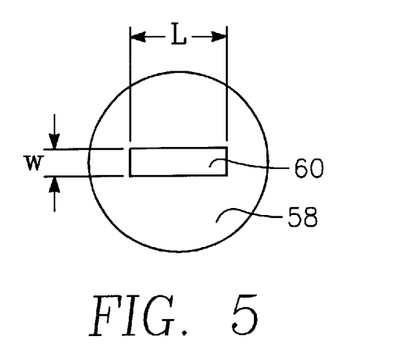
FIG. 5 is an end view of the microwave probe of FIG. 4 taken along view line 5—5.

The parameters of the probe 50 of FIGS. 4 and 5, particularly the resonator length l and the gap d are selected to match the impedance $Z_W$ of the dielectrically loaded waveguide and the impedance $Z_1'$ of the combination of the gap 68 and resonator 54.

The radiation impedance $Z_{Sl}$ for a resonant slit having a uniform dielectrically loaded waveguide on one side is not amenable to analytical solution. We have instead relied upon a full 3-dimensional finite-element simulation, relying upon HFSS V5 software available from Ansoft. For the parameters used in our final design, the radiation resistance $Z_{Sl}$ is calculated to be about 3000Ω. This very high impedance, absent the impedance transformer of the invention, allows only a few percent of the incident microwave energy to propagate through the slit.

To overcome the high mismatch between the dielectrically loaded waveguide and the resonant slit, concepts are borrowed from the field of design of classic waveguide resonator filters and some more recent work on miniature waveguide antennae. Without the dielectric loading in the gap, the waveguide cannot support the low-order modes of microwave radiation. Therefore, the dominant mode across the gap is evanescent, and this mode controls the coupling between the feeding waveguide and the resonator.

A set of five equations may be used to describe the system. The first equation gives the impedance $Z_W$ of the dielectrically loaded waveguide $$Z_w = \frac{Z_0}{\sqrt{\varepsilon - (k_c/k_0)^2}}, \tag{2}$$

where $Z_O = 377\Omega$, the impedance of free space, $\epsilon$ is the dielectric constant of the two rods, $k_c$ is the cutoff wavenumber of the unloaded cylindrical waveguide, $k_O$ is the vacuum wavenumber $\omega/c$, $\omega$ is the radial frequency of the microwave radiation, and c is the speed of light. For the $TE_{11}$ mode in a circular waveguide, $k_c \approx 1.841/a$, where a is the radius of the waveguide. The second equations gives the impedance $Z_g$ of the gap $$Z_g = \frac{Z_0}{\sqrt{(k_c/k_0)^2 - 1}} \approx \frac{k_0}{k_c} Z_0. \tag{3}$$

The third equation, based on the assumption of the fundamental mode, gives the impedance $Z_1$ of the dielectric resonator rod $$Z_l = Z_w \frac{Z_{sl} + jZ_w \tan\beta l}{jZ_{sl}\tan\beta l + Z_w}, \tag{4}$$

where l is the length of the resonator dielectric rod and the resonator propagation factor $\beta$ is given by $$\beta = \sqrt{\varepsilon k_0^2 - k_c^2}. \tag{5}$$

The value of the slit impedance $Z_{Sl}$ is very dependent upon the frequency as the slit goes into and out of resonance. Also note that these last two equations ignore the convex outer surface supporting the resonant slit in the embodiments of FIGS. 6 and 7. It is believed that such a convex end makes a constant contribution to the value of the resonator length l, but has no other significant effect. The final equation gives the impedance $Z_1'$ of the combination of the resonator and air gap, again assuming the fundamental mode, $$Z_l' = -jZ_g \frac{Z_l - jZ_g \tanh \alpha d}{Z_l \tanh \alpha d - jZ_g}, \tag{6}$$

where d is the length of the resonator dielectric rod and $\beta$ is the attenuation factor in the gap $$\alpha = \sqrt{k_c^2 - k_0^2} \approx k_c. \tag{7}$$

The resonator is matched when the resonator/gap impedance equals the loaded waveguide impedance $Z_l' = Z_W$. As a result, there are two scalar equations for the real and imaginary parts, which can be solved for the two design parameters l and d.

A full simulation using the Ansoft software rather than the above equations has been used to calculate the microwave reflection coefficient $S_{11}$ as a function of frequency with the two design parameters as variables. Assuming that the adaptor provides impedance matching between the coaxial cable and the dielectrically loaded waveguide, the reflection coefficient is related to the above impedances by $$S_{11} = \frac{Z_w - Z_l'}{Z_w + Z_l'}. \tag{8}$$

Figure 8:
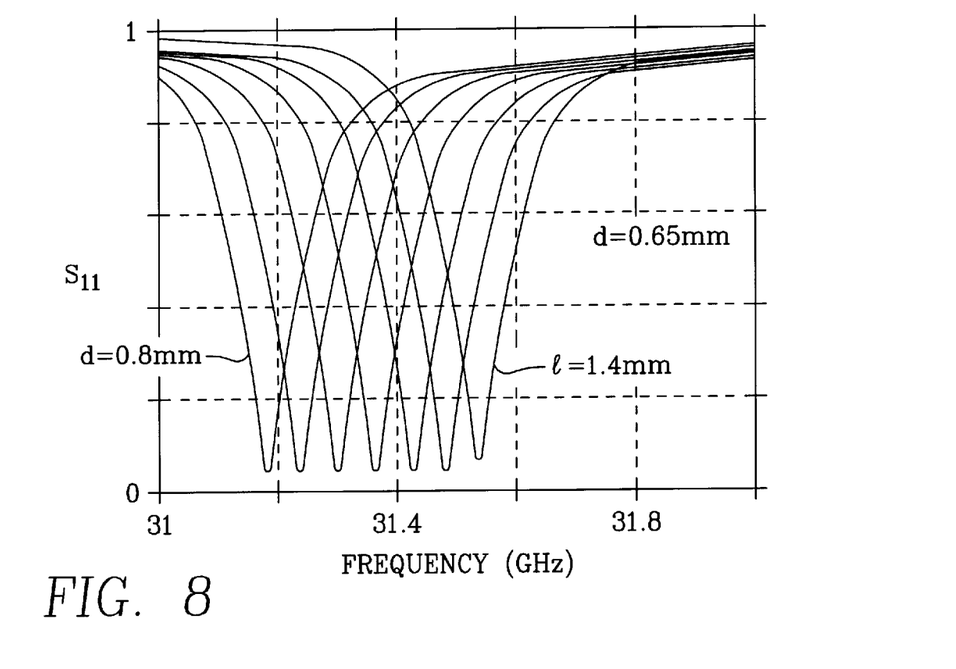
FIGS. 8 and 9 are graphs showing calculations of microwave reflectance of a simplified version of the microwave probe of FIGS. 4 and 5 as a function of the microwave frequency and with the resonator length and gap width as parameters.

In the simulation, the width w of the matched slit is 2 μm, and the dielectric constant ε of the dielectric material is 9.8. A series of plots shown in FIG. 8 were calculated for a gap width d of 0.65 mm and for the resonator length l varying from 0.8 to 1.4 mm. Thus, matching to better than 0.1 (−20 dB) is possible, with the resonator length determining the best matched frequency (or alternatively the best slit length for a given frequency). Note that the resonant condition does not precisely conform to simple model of the radiation length of the resonator rod. It is believed that the difference arises at least in part from the resonant slit, which introduces a large resistive impedance at resonance instead of the short which would be present without the slit.

Figure 9:
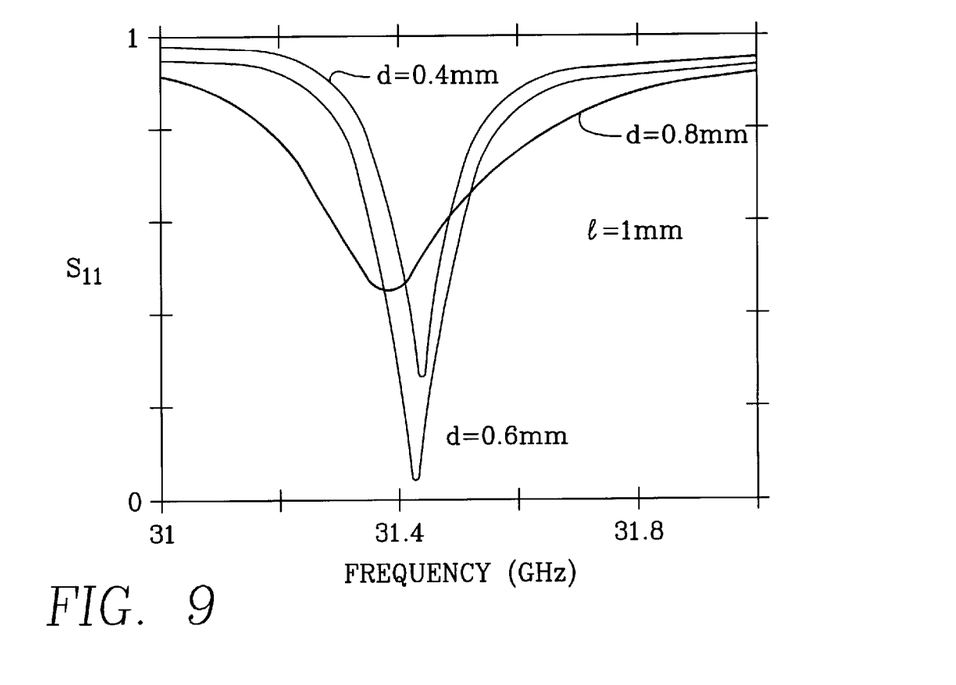

Based on the simulation, when the dielectric resonator length l is kept at 1 mm and the air gap d is varied between 0.4 and 0.8 mm, as shown by the plots of FIG. 9, the peak performance (minimum reflectance) occurs at some intermediate gap width near d=0.6 mm. The free space wavelength of 31.4 GHz radiation is 9.4 mm so the effective values of the gap width d are substantially less than the microwave wavelength and preferably less than a tenth of the wavelength. On the other hand the gap width d should be at least 0.1% and preferably more than 1% of the free-space wavelength.

A more rigorous analysis concludes that the minimal gap is related to the attenuation length which is the inverse of the attenuation factor a of Equation (7) since for each bounce the wave attenuates exponentially in the gap according to exp (−αd) and the attenuation needs to be appreciable. As a rule of thumb, the minimum gap is determined by the condition $$\beta \cdot d > 0.1 \tag{9}$$

The maximum gap preferably is no more than 10 or 20 times this size. Alternatively stated for a waveguide, the gap d should be at least 10% of D, which is the diameter 2a of a circular waveguide or the larger dimension of a rectangular waveguide. As will be discussed below, the gap size increases if the gap is filled with a dielectric material.

The simulation results show that for a 2 μm-wide slit, the usable frequency bandwidth, for example, at the −10 dB reflection level, is about 60 MHz, which is sufficient for the operation of a practical microwave microscope.

Figures 10, 11:
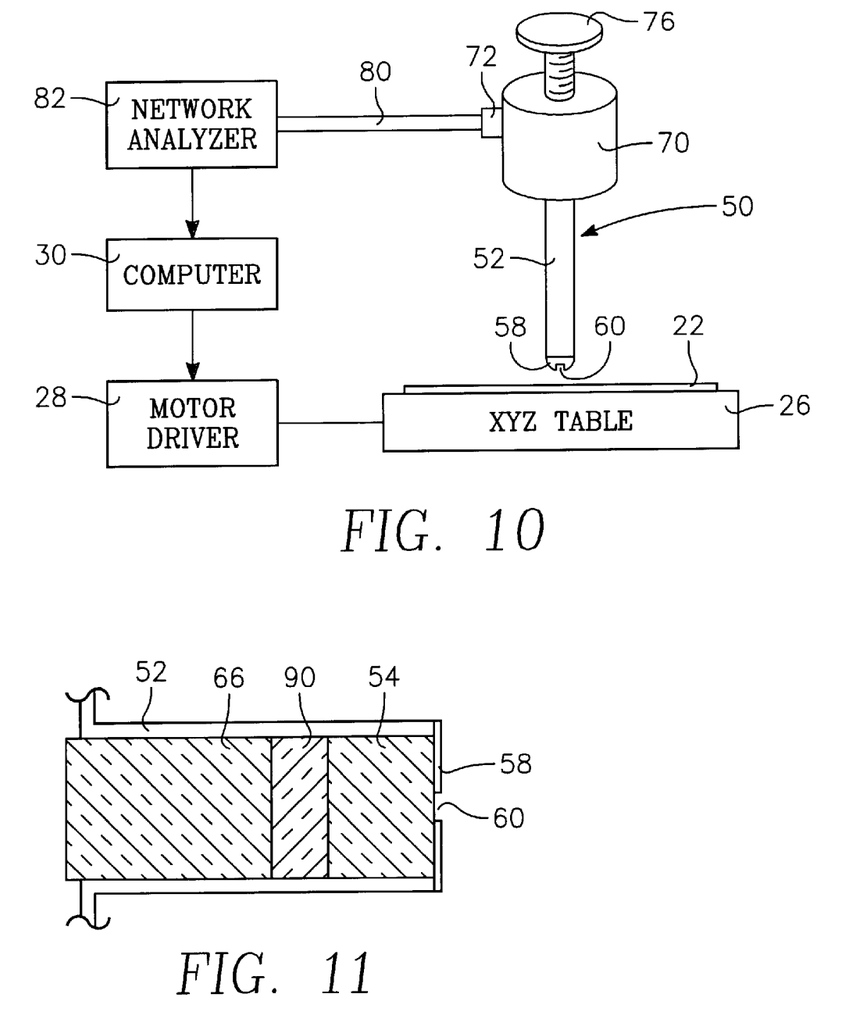
FIG. 10 is a schematic diagram of a scanning microwave microscope system using the probe of the invention.
FIG. 11 is a cross-sectional view of yet another embodiment of the probe of the invention using a low dielectric constant member in the gap.

The impedance matching allows a simplified microscope system as illustrated schematically in FIG. 10. The sample 22, the XYZ table 26, the motor drive 28, and the computer 30 are the same or similar to the prior art arrangement. The microwave probe of this embodiment of the invention includes the microwave waveguide 52 extending toward the surface of the sample 22 with its probe tip having a hemispherical conductive coating 58 of silver or aluminum and resonant slit 60 positioned only slightly above the surface. The adaptor 70 couples the dielectrically loaded waveguide 52 to a 50Ω coaxial cable 80. A microwave network analyzer 82, such as model HP-8510C available from Agilent Technologies, provides the required microwave probe signal and quadrature detection of the microwave signal reflected back to the analyzer 82.

The resonance is tuned by positioning the probe tip away from a sample and adjusting the tuning screw 76 to obtain minimum reflectance at some frequency. The XYZ stage 26 then moves the surface of the sample 22 vertically to within a very small separation from the probe tip, on the order of micrometers. In this position, the XYZ stage 26 scans the sample 22 horizontally across the probe tip with the distance between the sample 22 and probe tip being maintained as constant as possible. The network analyzer 82 measures the reflectance magnitude and phase as a function of frequency for each sample point.

Some applications of the microwave microscope of the invention include the qualitative characterization of the uniformity of a conducting layer, detection of sharp conducting lines, and detection of discontinuities and scratches in conducting layers. For these applications, the measurement of magnitude of the microwave reflectance $S_{11}$ at a particular frequency is satisfactory to map the electrical characteristics of the sample being scanned. However, for the quantitative characterization of the thickness of conducting layers, the microwave reflectance $S_{11}$ does not vary in a monotonic fashion with the thickness of the metal layer. Moreover, the phase of the reflectance is discarded in this method while the phase nonetheless contains information about the sample. For these more demanding applications and in order to increase sensitivity, it is preferred to measure at every sample point the complex microwave reflectance $S_{11}$ over a range of frequencies, rather than measuring a magnitude at a single frequency and discarding the phase. These data allow the determination of the quality factor Q and the resonant frequency $f_O$ of the combination of the probe and sample. These two parameters should be constant or nearly so over the range of measurement frequencies. Therefore, using the data over the frequency range improves the signal to noise. The determination of Q and $f_O$ may be done by a number of known methods.

The spatial resolution of the probe was tested at a single frequency of 25.4 GHz using a 10 μm-wide slit with a probe-sample separation of 10 μm to a NIST resolution target having five chromium lines and gaps therebetween, all of 30 μm width. The structure was well resolved.

The probe was also tested with several thin conducting films of different and controlled thicknesses. For these measurements, bringing a highly conductive thick sample close to the probe tip decreases the resonant frequencies by 10 to 50 MHz and increases the Q-factor from 70–100 to 120–150. The measurements are strongly dependent not only on the sample resistance and film thickness but also on the probe-sample separation. The measurements show that, for sheet resistances of greater than 1ω, the minimum reflectance as a function of frequency varies nearly linearly with the sheet resistance (inverse thickness). However, for lesser sheet resistances, the reflectance is close to its maximum value of one and is thus insensitive to small thickness variations. For these small values of sheet resistance, the inverse quality factor $Q^{-1}$, calculated with the complete data analysis described above, varies nearly linearly with sheet resistance down to at least $0.1\omega$.

The use of the dielectric hemispherical lens or other convex dielectric surface as a support for the curved slit is advantageous for several reasons. It allows a very thin conductive end wall. Its curvature along the slit length provides increased resolution in that direction. Also, a more acute probe tip reduces problems associated with the sample surface not being perfectly flat or not being perfectly perpendicular to the axis of the probe. However, a doubly convex end of the resonator member introduces the problem of how to form a narrow slit on the two dimensionally curved surface. The following procedure can be used. A small quantity of Oxford varnish is dissolved in a 1:1 mixture of toluene and ethanol. A very thin varnished thread is obtained by pulling varnish in the form of a thread from a drop of the solution. It quickly solidifies in air and forms a very thin free-standing thread analogous to a spider web pulled from liquid spittle. The varnish thread is placed on the hemisphere or convex surface along the intended path of the slit, and it sticks there. Electron beam evaporation is used to coat the thin silver layer on the so masked convex surface After the silver coating, the varnished thread is dissolved in acetone leaving a long and thin slit in the silver layer. The extremities of the slit are then covered with silver paint to achieve a prescribed slit length of 3 to 4 mm. Slits have been fabricated according to this method with widths in the range of 30 $\mu$m down to 0.5 $\mu$m. The slit width may be further reduced by an electroless plating process. The same procedure may be used for a flat slit surface and for forming crossed slits.

It is possible to make the area of the gap more complex. The two dielectric rods may have different dielectric constants. Additional short dielectric or conducting members may be placed inside the gap. By pushing them back and forth, the impedance transform may be tuned.

As illustrated in the cross-sectional view of FIG. 11, the gap may be replaced by a dielectric spacer rod 90 between the feeder dielectric rod 66 and the resonator rod 54. The spacer rod 90 has a dielectric constant $\epsilon_g$ that is small enough that the waveguide 52 will not support the lower-order modes of microwave radiation in the spacer rod 90, but instead the microwave radiation is attenuated across the spacer rod 90. However, the dielectric constants $\epsilon_1$ and $\epsilon_3$ of the feeder dielectric rod 66 and the resonator rod 54 respectively are much larger and do allow supported propagation of the microwave radiation. In comparison, the dielectric constant $\epsilon$ of air is one. This embodiment is not easily tuned, but the simpler design is easier to assemble and maintain in tune.

The use of a spacer rod with a non-unity dielectric constant $\epsilon_g$ affects some of the modeling described above. The value of the gap impedance of Equation (3) should be modified to $$Z_g = \frac{Z_0}{\sqrt{(k_c/k_0)^2 - \varepsilon_g}} \quad (10)$$

and the attenuation factor $a$ of Equation (7) should be modified to $$\alpha = \sqrt{k_c^2 - \varepsilon_g k_0^2}. \quad (11)$$

As a result, the gap d increases with the gap dielectric constant $\epsilon_g$ as long as the gap remains far below cutoff.

Figure 12:
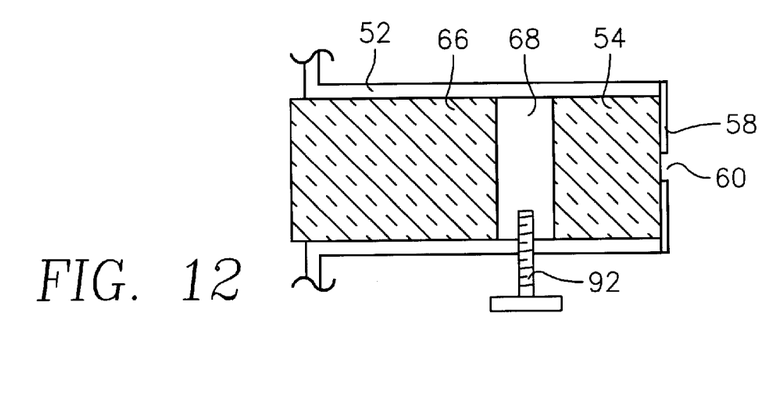
FIG. 12 is a cross-sectional view of still another embodiment of the probe of the invention using a tuning screw.

Other types of tuning may be used, as is well known for dielectric resonators. One example uses a threaded joint in the waveguide in the vicinity of the gap so rotating one part relative to the other will change the gap size. Another example of a tuning mechanism, illustrated in the cross-sectional view of FIG. 12, includes a tuning screw 92 threaded through the waveguide wall 52 in the vicinity of the air-filled gap 68. The tip of the tuning screws 92 may be metallic or dielectric. Varying the length of the tuning screw 92 in the gap 68 will change the coupling into the resonator.

Although alumina has been used for the two dielectric rods, other materials manifesting a high dielectric constant may also be advantageously used, especially those having a dielectric constant $\epsilon$ of 20 and over, for example, LaAlO$_3$ ($\epsilon$=25), various ceramics based on BaTiO$_3$ ($\epsilon$=20–25), and rutile or TiO$_2$ ($\epsilon\approx$90).

Although the described invention uses a cylindrical waveguide, it may also be applied to square or rectangular waveguide although then the two dielectric members should have similar shapes so as to closely fit within the waveguide. It is possible even to use ridge waveguides formed on a wafer or board.

The long dielectric feeder rod need not necessarily closely fit the waveguide. It is possible, for example, to use a circular rod in a square or rectangular waveguide. However, it should fill most of the cross section of the waveguide in order to allow wave propagation at the operating frequency. On the other hand, the resonator rod should closely fit its portion of the waveguide.

The waveguide need not be a separate entity. Instead, one or both dielectric members may be coated with metal to form the waveguide. If an air gap is used, then a separate waveguide is required in the gap area. If the gap is made of the low dielectric constant spacer rod and the rods of equal diameter are fixed together with adhesive, the metal coating may be made continuous across the effective gap.

Although the described embodiment uses the same waveguide to irradiate the sample and to receive radiation from the sample, that is, operating in the reflective mode, it is possible to operate in transmission mode, as described in the cited patents.

The invention may also be applied to the more complex cross-slit configuration of U.S. Pat. No. 6,100,703, for example, for measuring anisotropic material characteristics. Such a probe has been satisfactorily tested. For this embodiment, the crossed slits need to be formed in the end of the probe. A second coaxial connector is needed in the adaptor. The two coaxial connectors are offset by 90°. With circular or square waveguides, the two orthogonal modes are degenerate so that the resonator is bimodal. A single variation of the gap will equally tune both modes to be impedance matched.

Thus, the invention extends the use of microwave microscopes to more difficult measurements of, for example, highly conductive metal lines. It also permits the resolution of microscopy to be maintained with decreased microwave frequency, either for reasons of less expensive equipment or to probe characteristics more discernible at lower frequency.

What is claimed is:

1. A microwave microscope probe, comprising:
    a microwave waveguide having a conductive end wall on one end thereof in which is formed a slit;
    a first dielectric member fit into said waveguide adjacent to said one end and having a first dielectric constant;
    a second dielectric member fit into said waveguide having a second dielectric constant and separated from said first dielectric member by a gap.

2. The probe of claim 1, further comprising a source of microwave radiation having a microwave frequency and a corresponding free-space wavelength, wherein said slit is resonant or nearly resonant at said microwave frequency.

3. The probe of claim 2, wherein said gap has a width of between 0.1% and 100% of said free-space wavelength.

4. The probe of claim 2, wherein said gap, a length of said first dielectric member, and a width of said slit are chosen to form a dielectric resonator at said microwave frequency.

5. The probe of claim 1, wherein said first dielectric member comprises a linearly extending dielectric member having a flat end coated with a metallic layer forming said end wall and in which said slit is formed.

6. The probe of claim 1, wherein said first dielectric member comprises a linearly extending dielectric member having a convex end coated with a metallic layer forming said end wall and in which said slit is formed.

7. The probe of claim 1, wherein said first dielectric member comprises:

a linearly extending dielectric member having a flat end; and another dielectric member having a flat surface fixed to said linearly extending dielectric member and a convex surface coated with a metallic layer forming said end wall and in which said slit is formed.

8. The microscope system of claim 1, where said gap has a dielectric constant lower than those of said first and second dielectric members.

9. A microwave microscope system for electrically characterizing a sample, comprising:

a source of microwave radiation producing microwave radiation at a microwave frequency;

a waveguide receiving said microwave radiation;

a conductive end wall at an end of said waveguide having a slit having a length and a width substantially less than said length formed in said end wall, said end wall being positionable adjacent a surface of said sample;

a first dielectric member of a first length fit into said waveguide at said end and having a first dielectric constant;

a second dielectric member of a second length fit into said first waveguide and separated from said first dielectric member by a gap of between 0.1 and 100% of a free-space wavelength of said microwave radiation and having a second dielectric constant; and a microwave detector receiving portions of said microwave radiation after interacting with said sample.

10. The microscope system of claim 9, wherein said microwave waveguide is sized such that it does not support said microwave radiation in said gap.

11. The microscope system of claim 9, further comprising:

a coaxial cable receiving said microwave radiation from said source of microwave radiation; and an adaptor coupling said coaxial cable to said waveguide.

12. The microscope system of claim 11, wherein said adaptor couples a fundamental TEM mode in said coaxial cable to a fundamental mode in said waveguide.

13. The microscope system of claim 11, wherein said coaxial cable is a first coaxial cable;

wherein said slit is one of a pair of cross slits formed in said conductive end wall, further comprising a second coaxial cable connected to said adaptor, and wherein said adaptor couples microwave radiation of a first polarization between said first coaxial cable and said waveguide and couples microwave radiation of a second polarization between said second coaxial cable and said waveguide.

14. The microscope system of claim 9, wherein said waveguide is one of a cylindrical or square waveguide and said first and second dielectric members are rods and further comprising a metal layer forming said conductive end wall and coated on an output surface of said second dielectric member in which said slit is formed.

15. A method of microwave microscopy, comprising the steps of:

providing a probe comprising a waveguide, a conductive wall formed on an end of said waveguide and having a slit formed therein, a first dielectric member fit into said waveguide adjacent said end, and a second dielectric member fit into said waveguide with a gap between said first and second dielectric members;

adjusting said gap to produce a minimum reflectivity of radiation against said end; and scanning said probe across a sample while feeding microwave radiation through said waveguide toward said end and measuring microwave radiation reflected from said end.

16. The method of claim 15, wherein said slit has a length that is nearly resonant with said microwave radiation and a width substantially smaller than said length.

17. The method of claim 15, wherein said second dielectric member has a length of at least twice a length of said first dielectric member.

18. The method of claim 15, wherein said gap has a length of between 0.1% and 100% of a free-space wavelength of said microwave radiation.

19. The method of claim 15, wherein said first and second dielectric members are separated by said gap along a propagation direction os said microwave radiation along said waveguide.

20. The probe of claim 1, further comprising a source of microwave radiation having a microwave frequency, wherein said waveguide does not support said microwave radiation at said microwave frequency in said gap.

21. The probe of claim 1, wherein said second dielectric member is slidable inside said waveguide to vary a size of said gap.

22. The probe of claim 1, further comprising a tuning screw threaded in a portion of said waveguide and projecting into said gap.

23. The probe of claim 9, further comprising a source of microwave radiation having a microwave frequency, wherein said waveguide does not support said microwave radiation at said microwave frequency in said gap.

24. A microwave microscope probe, comprising:

a microwave waveguide having a conductive end wall on one end thereof in which is formed a slit;

a first dielectric member fit into said waveguide adjacent to said one end and having a first dielectric constant of first value such that microwave radiation of a fixed frequency resonantly propagates in a region of said waveguide containing said first dielectric member;

a second dielectric member fit into said waveguide on a side of said first dielectric member opposite said one end and having a second dielectric constant of a second value lower than said first value and such that microwave radiation of said fixed frequency does not resonantly propagate in a region of said waveguide containing said second dielectric member; and a third dielectric member fit into said waveguide on a side of said second dielectric member opposite said one end and having a third dielectric constant of a third value higher than said second value and such that microwave radiation of said fixed frequency resonantly propagates in a region of said waveguide containing said third dielectric member.

25. The probe of claim 24, further comprising a source of microwave radiation of said fixed frequency coupled to an end of said waveguide opposite said one end.

* * * * *